United States Patent
Wu

(10) Patent No.: US 10,274,901 B2
(45) Date of Patent: Apr. 30, 2019

(54) WEARABLE ARTICLE

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 15/527,842

(22) PCT Filed: May 5, 2016

(86) PCT No.: PCT/CN2016/081096
§ 371 (c)(1),
(2) Date: May 18, 2017

(87) PCT Pub. No.: WO2017/166372
PCT Pub. Date: Oct. 5, 2017

(65) Prior Publication Data
US 2018/0188694 A1    Jul. 5, 2018

(30) Foreign Application Priority Data
Mar. 28, 2016 (CN) .......................... 2016 1 0182013

(51) Int. Cl.
G04G 21/08 (2010.01)
G04G 9/00 (2006.01)
(Continued)

(52) U.S. Cl.
CPC ........... *G04G 9/0017* (2013.01); *G04B 47/00* (2013.01); *G04B 47/06* (2013.01); *G04G 9/0064* (2013.01);
(Continued)

(58) Field of Classification Search
CPC ........ G04B 47/06; G04B 47/00; G04G 17/02; G04G 21/00; G04G 21/08; G04G 9/0017;
(Continued)

(56) References Cited

U.S. PATENT DOCUMENTS 6,549,791 B1 * 4/2003 Jeon .................. H04B 1/385
379/433.08
7,081,905 B1 * 7/2006 Raghunath ............ G04G 5/00
345/684
(Continued)

FOREIGN PATENT DOCUMENTS

CN      1324030 A     11/2001
CN    103984221 A      8/2014
(Continued)

OTHER PUBLICATIONS

Multiplex—definition—google.com—Oct. 18, 2017.*
International search Report dated Dec. 27, 2016.
First Chinese Office Action dated Aug. 2, 2017.

*Primary Examiner* — Sean P Kayes
(74) *Attorney, Agent, or Firm* — Dilworth & Barrese, LLP.; Michael J. Musella, Esq.

(57) ABSTRACT

A wearable article is disclosed. The wearable article includes a body and a connecting portion connected to the body, the body includes a processing device, the wearable article further includes at least one removable device disposed on the connecting portion, the removable device is configured for connecting to the processing device.

13 Claims, 3 Drawing Sheets

(51) Int. Cl.
*G04G 21/00* (2010.01)
*G04B 47/00* (2006.01)
*G04B 47/06* (2006.01)
*G04G 17/02* (2006.01)
*G04G 99/00* (2010.01)
*G06F 3/0488* (2013.01)
*G04G 17/06* (2006.01)
*G06F 1/16* (2006.01)

(52) U.S. Cl.
CPC ............ *G04G 17/02* (2013.01); *G04G 17/06* (2013.01); *G04G 21/00* (2013.01); *G04G 99/006* (2013.01); *G06F 3/0488* (2013.01); *G04G 21/08* (2013.01); *G06F 1/163* (2013.01)

(58) Field of Classification Search
CPC .... G04G 9/0064; G04G 99/006; G04G 17/06; G06F 1/163
See application file for complete search history.

(56) References Cited

U.S. PATENT DOCUMENTS

| | | | | |
|---|---|---|---|---|
| 7,618,260 | B2* | 11/2009 | Daniel | A44C 5/0007 24/311 |
| 9,600,030 | B2* | 3/2017 | Bailey | G06F 1/163 |
| 9,727,174 | B2* | 8/2017 | Starner | G02B 27/017 |
| 9,760,214 | B2* | 9/2017 | Li | G06F 3/0423 |
| 9,922,179 | B2* | 3/2018 | Son | G06F 21/31 |
| 2002/0122354 | A1* | 9/2002 | Williams | G04G 13/021 368/12 |
| 2007/0279852 | A1* | 12/2007 | Daniel | A44C 5/0007 361/679.03 |
| 2010/0231522 | A1* | 9/2010 | Li | G06F 3/0423 345/169 |
| 2012/0249409 | A1* | 10/2012 | Toney | G06F 3/017 345/156 |
| 2015/0105125 | A1 | 4/2015 | Min et al. | |
| 2015/0268799 | A1* | 9/2015 | Starner | G02B 27/017 345/175 |

FOREIGN PATENT DOCUMENTS

| | | |
|---|---|---|
| CN | 203982098 U | 12/2014 |
| CN | 203986449 U | 12/2014 |
| CN | 204166295 U | 2/2015 |
| CN | 204302663 U | 4/2015 |
| CN | 204631448 U | 9/2015 |
| CN | 104965588 A | 10/2015 |
| CN | 105430189 A | 3/2016 |
| DE | 20202571 U1 | 2/2002 |
| WO | 2015168590 A1 | 11/2015 |

* cited by examiner

WEARABLE ARTICLE

FIELD OF THE ART

The present disclosure relates to the field of intelligent electronic devices, more particularly, to a wearable article.

BACKGROUND

Smart watches currently available on the market have many functions like picture-capturing, timing, alarming and so on. However, devices for implementing the functions are all integrated in the watch body, making the watch body heavy and thick and not comfortable to wear. Moreover, functions of the smart watches are already set when manufactured by manufacturers, which makes it impossible for users to add new functions during use, compromising user experience.

SUMMARY

A first aspect of the disclosure provides wearable article, comprising a body and a connecting portion connected to the body; the body comprises a processing device. The wearable article further comprises at least one removable device disposed on the connecting portion, the removable device is configured as being connected to the processing device.

A second aspect of the disclosure provides a smart watch comprising a watch body and a watchband connected to the watch body, wherein the watch body comprises a processing device and a display device connected to the processing device, the display device is configured for forming a display region on the watch body. The smart watch further comprises at least one removable device disposed on the watchband and configured as being connected to the processing device.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some of embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Chinese patent application No. 201320554557.0 discloses a smart watch having a time reminding function. That is, a speaker disposed on a watchband thereof reminds people what to do at a certain moment. The smart watch has rather simple functions, and positions and functions of respective modules are already set when manufactured by the manufacturers, making it impossible for a user to make any change.

Embodiments of the disclosure provide a wearable article having removable functional modules or devices, which not only reduces the thickness and the weight of the body of the wearable article, but also increases flexibility of product functions.

Figure 1:
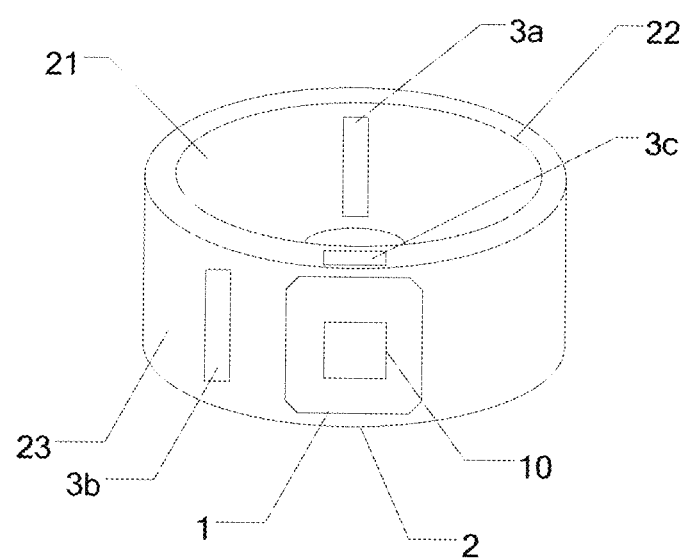
FIG. 1 schematically illustrates a wearable article in accordance with an embodiment of the disclosure.
Figure 2:
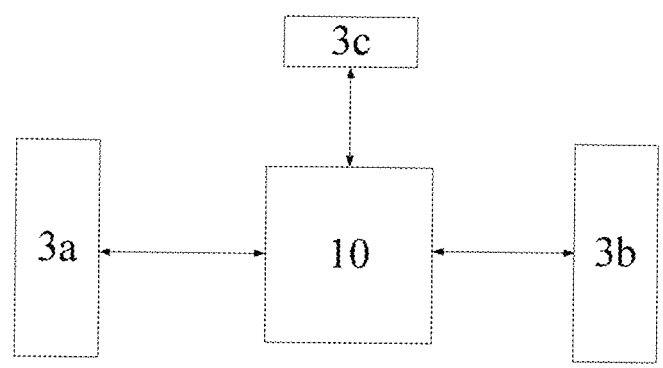
FIG. 2 is a block diagram of a wearable article in accordance with an embodiment of the disclosure.

As illustrated in FIGS. 1 and 2, a wearable article in accordance with an embodiment of the disclosure comprises a body 1 and a connecting portion 2 connected to the body 1, the body 1 comprises a processing device 10; the wearable article further comprises a plurality of removable devices 3 (3a, 3b, 3c) disposed on the connecting portion 2, each of the removable devices is connected to the processing device 10.

Herein, the "wearable article" includes but is not limited to a wristband, an ankle-band, an armband, a ring, a necklace, a watch, a scarf, a hat and the like. The "body" of the wearable article refers to a part of the wearable article which can process signals or data, such as a watch body of a smart watch. The "connection portion" of the wearable article refers to a part which is connected to the body and forms a closed circle with the body when being worn, such as a watchband and a watch chain of a smart watch. The connecting portion is used to wear the wearable article to a portion of a human body. "a plurality of" means two or more.

In at least some of the embodiments of the disclosure, the processing device 10 is implemented as a general computing device (such as a CPU), a specific-purpose computing device (such as a DSP). The removable device 3 includes but is not limited to a power source, a sensor, an image display device, an image acquisition device, a data storage device and a touch control device. An external power source is for example a battery, which is connected to the processing device through a cable or a data line and configured to charge the wearable device. The sensor is for example an accelerator, a magnetometer or a gyroscope, and used for measuring and obtaining information of position, speed, acceleration, direction of a user when the user moves. The image display device is for example a small LCD for displaying image signals from the processing device. The image acquisition device is for example a camera used to capture static or dynamic pictures and to transmit the image signals to the processing device. The data processing device is for example a mobile data memory for exporting data in the processing device or importing data to the processing device. Suitable connecting means may be chosen, based on functions of the removable devices, to connect the removable devices with the processing device. The connection may be wired or wireless. The communication between the removable devices and the processing device may be achieved by current or data.

Still referring to FIG. 1, the removable device 3a is disposed on a first surface 21 of the connecting portion 2 which is proximal to the human body; the removable device 3b is disposed on a second surface 23 of the connecting portion 2 which is distal to the human body. The first surface 21 normally contacts human skin, disposing the removable device 3a on this side of the connecting portion 2 makes it difficult for the removable device 3a to fall out due to external vibration. As an example, a removable device 3a such as a battery may be mounted on the first surface 21. The second surface 23 is an external surface of the wearable article. Disposing the removable device 3b on this side of the connecting portion 2 makes it easy for the user to mount and remove the removable device 3b anytime and anywhere. For example, the removable device 3b such as an image acquisition device, an image display device or a data storage device is mounted on the second surface 23. Optionally, the removable device 3c is disposed on a lateral surface 22 of the connecting portion 2 (or the other lateral surface opposite to the lateral surface 22), which not only saves usable surface space of the wearable article, but also makes user operation easy. Such a configuration is especially suitable for watches. It can be contemplated that the above number and disposition of the removable devices are for illustrative purpose only. A person skilled in the art may arrange different amount of removable devices on the respective surfaces as needed, or arrange all removable devices on the same surface, for example all removable devices are arranged on the second surface 23 of the connecting portion. In the embodiment, there are multiple of the removable devices. In at least some of embodiments of the disclosure, there is one removable device, which may also fulfill the purposes of the disclosure.

Figure 3:
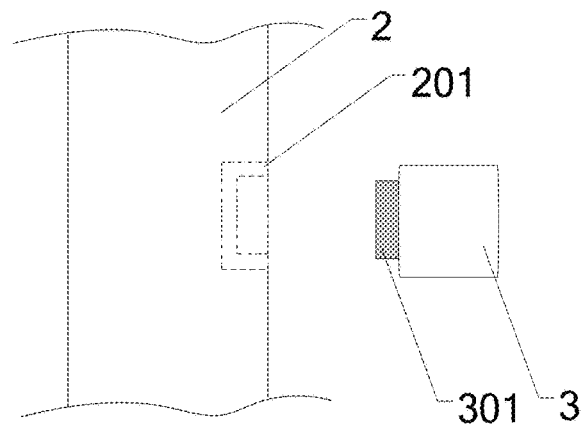
FIG. 3 schematically illustrates a removable device in accordance with an embodiment of the disclosure.

As illustrated in FIG. 3, in at least some of embodiments of the disclosure, the removable device 3 comprises a securing member 301, the removable device 3 is mounted on the connecting portion 2 via the securing member 301. For example, the securing member 301 may be a plug of the device, such as a USB plug. Accordingly, the connecting portion 2 comprises a receiving member 201 with a shape and a size matching that of the securing member 301 and suitable for accommodating the securing member 301. As an example, the receiving member 201 may be a socket or in other forms. As an example, the removable device 3 is a battery, and the receiving member 201 is a groove for accommodating the battery. In at least some of embodiments of the disclosure, the receiving member 201 further comprises a fastener such as a magnet or a spring tab, which is configured for further fastening the removable device 3. When there are multiple removable devices, the receiving member 201 on the connection portion 2 may also be multiple and in a one-to-one correspondence with multiple removable devices.

In at least some of embodiments of the disclosure, the body 1 is embedded in the connecting portion 2, or they are fabricated separately and then interconnected together. A material of the connecting portion 2 may be flexible or rigid. "Rigid" means the material has certain hardness, such as a hard plastic or a metal. A connecting portion 2 made of a rigid material not only makes it easy to manufacturing the receiving member for accommodating the removable device 3, but also can protect the wearable device from being damaged by external impact. On the other hand, a flexible material may provide better comfortability and good fitting with the human body, and keep people warm. For example, an article such as a scarf or a hat is made of a textile. As an example, the flexible material is elastic, which makes it easy to secure the wearable article to the human body.

Figure 4:
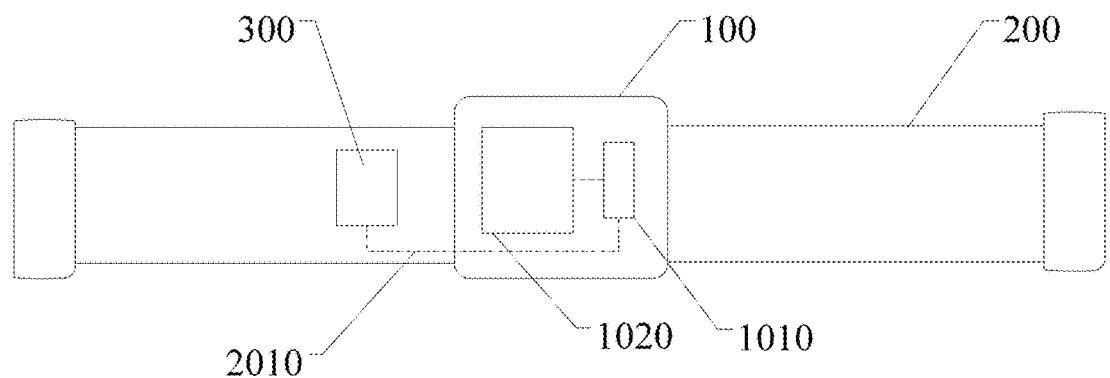
FIG. 4 schematically illustrates connecting means of a removable device in accordance with an embodiment of the disclosure.

In at least some of embodiments of the disclosure, the wearable article is a smart watch. For example, as illustrated in FIG. 4, the smart watch comprises a watch body 100 and a watchband 200 connected to the watch body 100, wherein the watch body 100 comprises a processing device 1010 and a display device 1020 connected to the processing device 1010, the display device 1020 is configured for providing a display region to display images signals from the processing device 1010. The watchband 200 comprises at least one removable device 300 connected to the processing device 1010.

Figure 5:
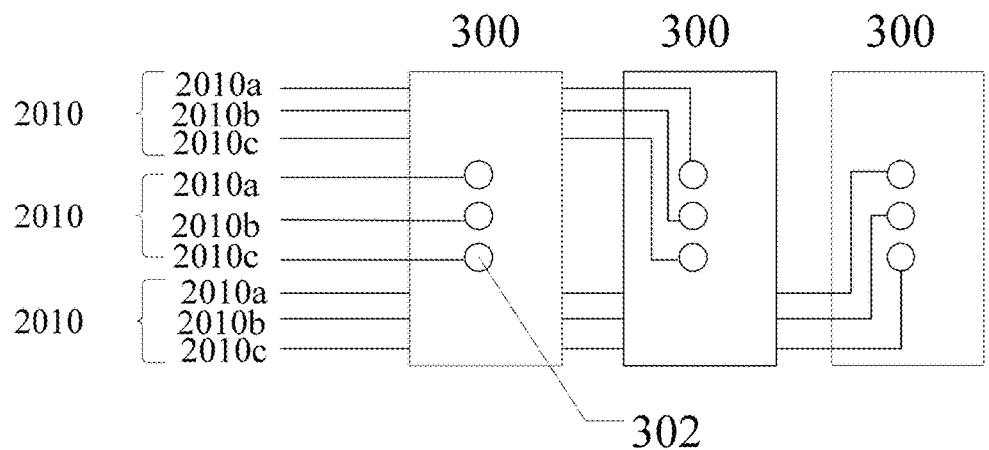
FIG. 5 schematically illustrates a smart watch in accordance with an embodiment of the disclosure.

In at least some of embodiments of the disclosure, the smart watch comprises at least one data line 2010 disposed in the watchband 200. The data line 2010 is configured for interconnecting the removable device 300 and the processing device 1010. As illustrated in FIG. 5, for example, the removable device 300 comprises first contacts 302, the watchband 200 comprises second contacts (not shown), one of the first contacts 302 is connected to the data line 2010c via one of the second contacts.

The data line 2010 may not only identify the removable device 300, but also transmitting information in the removable device 300 to the processing device 1010. For example, the removable device 300 is a battery, electrodes thereof may supply power to the watch body 100 via the data line 2010. As another example, the removable device 300 is a sensor, which transmits data collected thereby to the processing device 1010 via the data line 2010. As illustrated in FIG. 5, in one example, each removable device is connected to the processing device 1010 through multiple data lines 2010 (2010a, 2010b, 2010c). The data line 2010a is configured to identify the removable device 300, the data line 2010b is configured to transmit information between the removable device 300 and the processing device 1010, and the data line 2010c is configured to output/input currents, for example, the battery of the smart watch may be configured to supply power to the removable device 300. As another example, the multiple removable devices 300 are connected to the processing device 1010 through one data line 2010. In this case, the processing device 1010 communicates with each of the removable devices 300 at regular time intervals to obtain information therefrom. A function of the removable device 300 may also be void, that is, a housing for filling or covering an empty groove or socket is disposed on the watchband 200.

Figure 6:
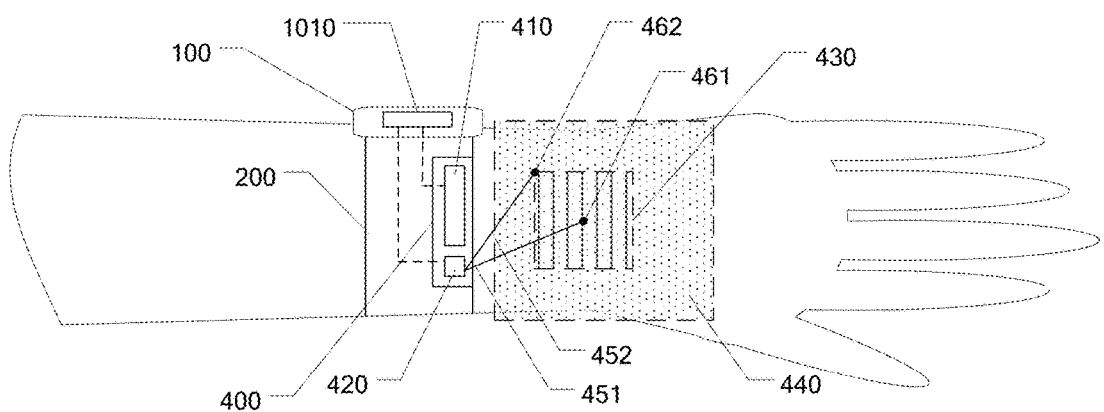
FIGS. 6 schematically illustrates a touch control device disposed on a watchband of a smart watch in accordance with an embodiment of the disclosure.

As illustrated in FIG. 6, in at least some of embodiments of the disclosure, the removable device comprises a touch control device 400. For example, the touch control device 400 is disposed on the watchband 200 and configured for forming a virtual touch region 430 in a predetermined region 440 outside the display region. The touch control device 400 comprises a touch detection unit 410 and a touch area positioning unit 420, the touch detection unit 410 and the touch area positioning unit 420 are respectively connected to the processing device 1010 in the watch body 100. For example, the touch detection unit 410 is configured for detecting the presence of a touch event in the predetermined region 440, that is, to detect whether a touch event occurs in the predetermined region 440. That is, predetermined region 440 is a range where the touch detection unit 410 may identify touch events. Moreover, the touch detection unit 410 is further configured for sending information on an occurrence position of the touch event to the processing device 1010. The touch area positioning unit 420 is configured for transmitting a first light beam 451 and a second light beam 452 to the predetermined region 449, the first light beam 451 irradiates a first position in the predetermined region 440 to form a first pattern 461, and the second light beam 452 irradiates a second position in the predetermined region 440 to form a second pattern 462.

The first pattern 461 and the second pattern 462 may be visible patterns, such that the user estimates the area to perform touch operation by viewing positions of the two patterns, so as to perform effective touch operation. Of course, the touch area positioning unit 420 may also be configured to emit more than two light beams to the predetermined region 440 so as to form more than two visible patterns in the predetermined region 440, to make it more convenient for the user to estimate the range of the virtual touch region 430 based on positions of the patterns. As an example, the first and second patterns are respectively light spots formed by the first and second light beams. As an example, the first and second patterns may be different in color and shape, to make it easy for the user to distinguish between them.

The processing device 1010 may process the information on the occurrence position of the touch event to obtain the occurrence position of the touch event, and to obtain the first position and the second position. The first position and the second position obtained by the processing device 1010 may be information stored in the processing device in advance, or obtained after the processing device 1010 processes the information transmitted thereto by the touch area positioning unit 420.

The touch area positioning unit 420 forms the first pattern 461 and the second pattern 461 in the predetermined region 440, allowing the user to estimate the region to touch (that is, the virtual touch region 430) based on the first and second patterns. In the virtual touch region 430, a touch from the user may be detected by the touch detection unit 410, and a position touched by the user may be computed by the processing device 1010. When the touch control device 400 is used in a watch, the position touched by the user in the virtual touch region 430 may correspond to a certain function for controlling the electronic device, thereby realizing man-machine interaction.

In the above embodiments of the disclosure, the removable functional devices are disposed on the removable article, which not only reduces the thickness and the weight of the body of the wearable article, but also increases comfortability during wearing and flexibility of product functions, thereby providing better user experience.

What is described above is related to the illustrative embodiments of the disclosure only and not limitative to the scope of the disclosure; the scopes of the disclosure are defined by the accompanying claims.

The present application claims priority from Chinese Application No. 201610182013.4, filed on Mar. 28, 2016, the disclosure of which is incorporated herein by reference in its entirety.

What is claimed is:

1. A wearable article, comprising a body and a connecting portion connected to the body, the body comprising a processing device and a display device connected to the processing device, the display device is configured for forming a display region on the body, the wearable article further comprising at least one removable device disposed on the connecting portion and configured as being connected to the processing device, wherein the at least one removable device is one of a plurality of removable devices, the plurality of removable devices are connected to the processing device through one data line, wherein the one data line is configured for interconnecting the plurality of removable devices and the processing device, the processing device is configured for communicating with each of the plurality of removable devices at regular time intervals to obtain information therefrom, wherein the least one removable device comprises a touch control device configured for forming a virtual touch region on a human body outside the display region, the virtual touch region and the display region are two separate regions, and wherein no virtual touch region and no display region overlap each other.

2. The wearable article of claim 1, wherein the at least one removable device comprises at least one of a power source, a sensor, an image display device, an image acquisition device, a data storage device and a touch control device.

3. The wearable article of claim 1, wherein a portion of the plurality of removable devices are disposed on a first surface of the connecting portion proximal to a human body, and other portions of the plurality of removable devices are disposed on a second surface of the connecting portion distal to the human body.

4. The wearable article of claim 1, wherein the at least one removable device comprises a securing member, wherein the securing member is configured for mounting the at least one removable device on the connecting portion, the connecting portion further comprises a receiving member configured for accommodating the securing member.

5. The wearable article of claim 4, wherein the securing member is a plug and the receiving member is a socket or a groove.

6. The wearable article of claim 1, wherein the wearable article is a smart watch.

7. A smart watch, comprising a watch body and a watchband connected to the watch body, wherein the watch body comprises a processing device and a display device connected to the processing device, the display device is configured for forming a display region on the watch body, the smart watch further comprises at least one removable device disposed on the watchband and configured as being connected to the processing device, wherein the at least one removable device is one of a plurality of removable devices, the plurality of removable devices are connected to the processing device through one data line, wherein the one data line is configured for interconnecting the plurality of removable devices and the processing device, the processing device is configured for communicating with each of the plurality of removable devices at regular time intervals to obtain information therefrom, wherein the least one removable device comprises a touch control device configured for forming a virtual touch region on a human body outside the display region, the virtual touch region and the display region are two separate regions, and wherein no virtual touch region and no display region overlap each other.

8. The smart watch of claim 7, wherein the at least one removable device comprises at least one of a power source, a sensor, an image acquisition device, a data storage device and a touch control device.

9. The smart watch of claim 7, wherein the at least one removable device comprises a first contact, the watchband comprises a second contact connected to the one data line, the first contact is removably connected to the second contact.

10. The smart watch of claim 7, wherein the at least one removable device is disposed on a lateral surface of the watchband.

11. The smart watch of claim 7, wherein the touch control device comprises a touch detection unit and a touch area positioning unit, the touch detection unit and the touch area positioning unit are respectively connected to the processing device.

12. The smart watch of claim 11, wherein, the touch detection unit is configured for detecting an occurrence of a touch event in the predetermined region and sending information on an occurrence position of the touch event to the processing device;

the touch area positioning unit is configured for transmitting a first light beam and a second light beam to the predetermined region, the first light beam irradiates a first position in the predetermined region to form a first pattern, and the second light beam irradiates a second position in the predetermined region to form a second pattern;

the processing device is configured for processing the information to obtain the occurrence position of the touch event, and to obtain the first position and the second position.

13. A smart watch, comprising a watch body and a watch band connected to the watch body, wherein the watch body comprises a processing device and a display device connected to the processing device, the display device is configured for forming a display region on the watch body, the smart watch further comprises at least one removable device disposed on the watchband and configured as being connected to the processing device, wherein the at least one removable device is one of a plurality of removable devices, the plurality of removable devices are connected to the processing device through one data line, wherein the one data line is configured for interconnecting the plurality of removable devices and the processing device, the processing device is configured for communicating with each of the plurality of removable devices to obtain information therefrom, and wherein the one data line is further configured for identifying the at least one removable device and transmitting information in the at least one removable device to the processing device, wherein the least one removable device comprises a touch control device configured for forming a virtual touch region on a human body outside the display region, the virtual touch region and the display region are two separate regions, and wherein no virtual touch region and no display region overlap each other.

* * * * *